(12) United States Patent
Rasche

(10) Patent No.: US 6,234,929 B1
(45) Date of Patent: May 22, 2001

(54) TENSIONER

(75) Inventor: Thomas Rasche, Hessdorf (DE)

(73) Assignee: INA Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/328,722

(22) Filed: Jun. 9, 1999

(30) Foreign Application Priority Data

Jun. 25, 1998 (DE) .............................. 198 28 309

(51) Int. Cl.[7] ........................................ F16H 7/08
(52) U.S. Cl. ............................ 474/110; 474/138
(58) Field of Search ..................... 474/110, 138, 474/135

(56) References Cited

U.S. PATENT DOCUMENTS

| | | | |
|---|---|---|---|
| 4,790,801 | * | 12/1988 | Schmidt et al. ............ 474/110 |
| 4,950,209 | * | 8/1990 | Kawashima et al. ............ 474/138 |
| 5,482,262 | * | 1/1996 | Hayakawa et al. ............ 474/138 X |
| 5,547,429 | * | 8/1996 | Hirabayashi et al. ............ 474/110 |
| 5,607,368 | | 3/1997 | Hida et al. . |
| 5,833,563 | * | 11/1998 | Takeda et al. ............ 474/138 |
| 6,036,612 | * | 3/2000 | Katogi et al. ............ 474/110 |

FOREIGN PATENT DOCUMENTS

| | | |
|---|---|---|
| 41 24 500 C2 | 1/1993 | (DE) . |
| 196 09 420 A1 | 9/1997 | (DE) . |
| 197 46 034 A1 | 4/1998 | (DE) . |
| 405321994 * | 12/1993 | (JP) ..................... 474/110 |

OTHER PUBLICATIONS

JP 09166190 A, Jun. 24, 1997, Tsubakimoto Chain Co., Hydraulic Tensioner, In: Patent Abstracts of Japan.

* cited by examiner

Primary Examiner—Rodney H. Bonck
Assistant Examiner—Ha Ho
(74) Attorney, Agent, or Firm—Henry M. Feiereisen

(57) ABSTRACT

A tensioner for traction means such as a belt, includes a housing which accommodates a cylinder for guiding a hydraulically dampened, spring-loaded plunger in an axial direction for tensioning the traction means. The interior space of the housing is closed by a cover which has a guide opening for passage of the plunger. A seal is placed outside the cover to seal an annular opening bounded by the housing and the plunger. In order to prevent a gas cushion under pressure and trapped between the cover and the seal, from pushing the seal from its seat, the cover is formed with a vent passageway which communicates with the interior space for release of the gas cushion via the vent passageway into the interior space.

4 Claims, 1 Drawing Sheet

TENSIONER

CROSS-REFERENCES TO RELATED APPLICATIONS

This application claims the priority of German Patent Application, Serial No. 198 28 309.1, filed Jun. 25, 1998, the subject matter of which is incorporated herein by reference.

BACKGROUND OF THE INVENTION

The present invention relates to a tensioner for traction means, in particular belts.

Tensioners of this type are frequently used in belt drives of motor vehicles. For example, German Pat. No. DE 196 09 420 A1 discloses a tensioner having a housing which receives a cylinder for guiding a hydraulically dampened plunger in longitudinal direction. The interior space of the housing forms a reservoir for hydraulic oil, whereby hydraulic oil under pressure migrates out of the cylinder into the interior space, and whereby hydraulic oil is drawn from the interior space into the high pressure chamber of the cylinder. The interior space of the housing is closed by a cover which has a guide opening for passage of the plunger. The housing has a cylindrical receptacle for forming a seat for the cover, and a seal which is positioned outside of the cover, and thus is mounted in place following an installation of the cover. When mounting the seal, the distance between the cover and the seal becomes smaller, so that a gas cushion trapped between the cover and the seal is compressed. As a consequence of the thus-generated overpressure exerted by the gas cushion, the conventional tensioner suffers the drawback that the seal is pushed out of its seat again, and thus out of the cylindrical receptacle.

SUMMARY OF THE INVENTION

It is thus an object of the present invention to provide an improved tensioner, obviating the afore-stated drawbacks.

In particular, it is an object of the present invention to provide an improved tensioner, which realizes a secure seat of the seal and is so configured as to prevent a gas cushion trapped between the cover and the seal from urging the seal out of its seat.

These objects, and others which will become apparent hereinafter, are attained in accordance with the present invention by providing the cover with a vent passageway in communication with the interior space for release of a gas cushion formed between the seal and the cover via the vent passageway into the interior space. The provision of a vent passageway enables a reduction of excess gas pressure trapped between the seal and the cover. Normally, the interior space, which is approximately at atmospheric pressure, is sufficiently sized so that the generated rise in pressure in the interior space due to intake of gas is negligible.

When providing the housing with a cylindrical receptacle for forming a seat for the cover and for the seal, the risk of an unintended pressure rise of trapped gas cushion can be eliminated through the arrangement of a vent passageway. Suitably, the cover and the seal have each an outer peripheral area which tightly or substantially tightly bears upon the inside wall surface of the cylindrical receptacle. Without provision of a vent passageway according to the present invention, the space in which the gas cushion builds up is effectively hermetically sealed off and thus poses the problems described above.

A further advantage of the tensioner according to the present invention, is the ability of hydraulic oil to migrate from the interior space via the vent passageway to the seal. As during reciprocating movements of the plunger in longitudinal direction, the seal and the plunger slide on one another, hydraulic oil can thus lubricate the seal in the sliding contact area with the plunger so that the service life of the seal can be significantly enhanced.

According to another feature of the present invention, the vent passageway may be formed by bores provided about the outer circumference of the cover. These bores may be configured, for example, of U shape. Suitably, the cover is made of sintered material by a sintering process so that the bores can be formed easily in a sintering mold.

According to still another feature of the present invention, the cylindrical receptacle forms a counterbore so as to define a radial shoulder for placement of the cover which thus is securely fixed in axial direction. When being provided at the outer circumference of the cover, the vent passageway projects radially inwards beyond the radial shoulder.

Oftentimes, the plunger supports a spring plate for support of one end of a helical compression spring whose other end rests against a housing bottom. When the plunger moves out of the cylinder, the spring plate impacts upon the cover. Suitably, the vent passageway is so configured as to have a cross sectional area of a size sufficient to extend, at least partially outside the impact zone between the spring plate and the cover so as to communicate with the interior space.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
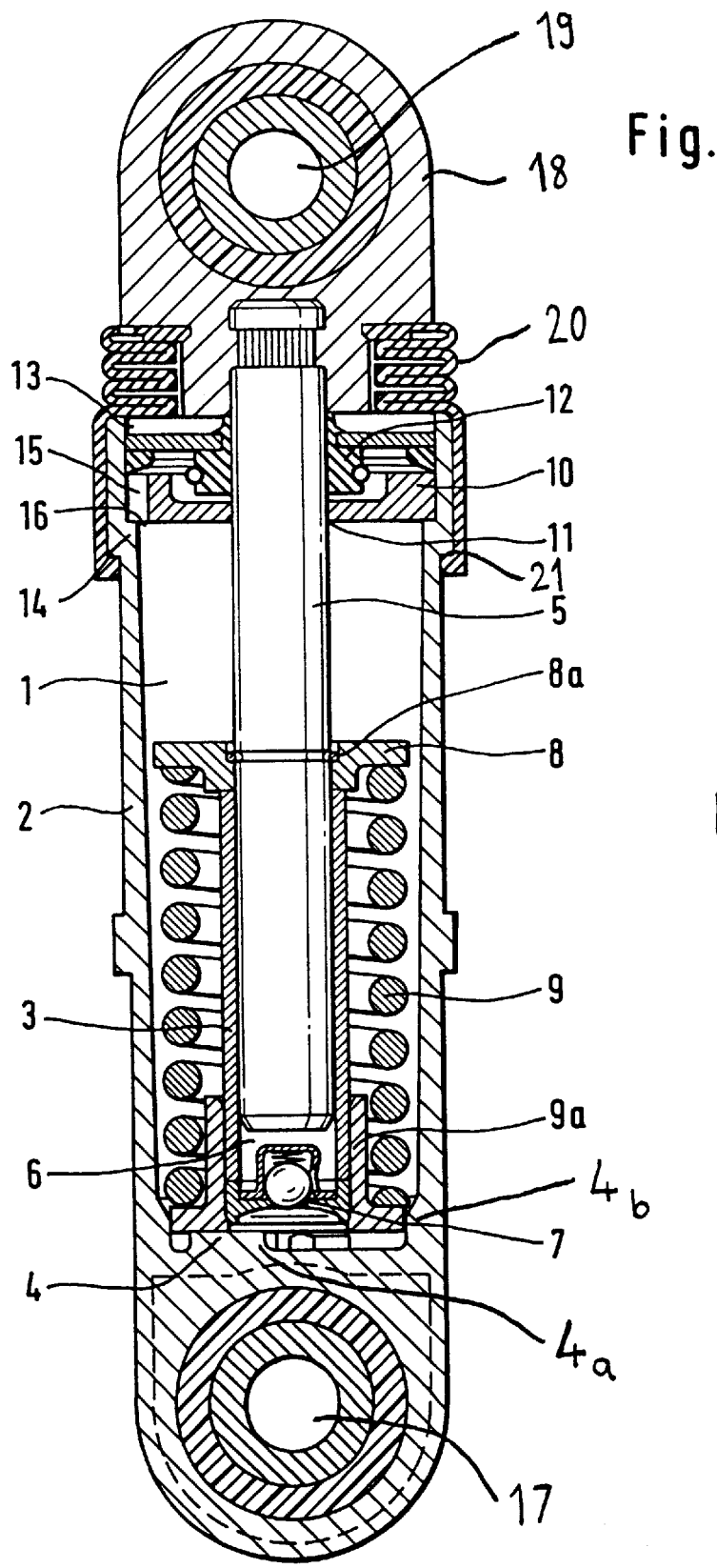
FIG. 1 is a longitudinal section of a tensioner according to the present invention.

Throughout all the Figures, same or corresponding elements are generally indicated by same reference numerals.

Turning now to the drawing, and in particular to FIG. 1, there is shown a longitudinal section of a tensioner according to the present invention, including a housing 2 having an interior space 1. Centered axially in the interior space 1 of the housing 2 is a cylinder 3 which is fitted at its lower end in a support member 9a and secured in axial and radial directions upon the bottom 4 of the housing 2 via suitable elevations 4a and radial projections 4b, respectively. A plunger 5 is guided in the cylinder 3 for displacement in axial direction, with the plunger 5 and the cylinder 3 demarcating a high pressure chamber 6. The housing 2 is open at one end and closed at the other end. At the closed end, the housing 2 is formed with a mounting hole 17 for attachment, for example, to a stationary machine part (not shown). The plunger 5 extends outwards through the open end of the housing 2 and is secured to an attachment piece 18 which is formed with a mounting hole 19 for securement to a traction element, such as a belt (not shown). The attachment piece 18 is secured to the housing 2 and sealed by a bellows-type gasket 20 which hooks behind a shoulder 21 of the housing 2.

The pressure chamber 6 communicates with the interior space 1 via a passage which is controlled by a check valve 7 that opens only for flow of hydraulic fluid, for example hydraulic oil, into the hydraulic chamber 6 when the fluid pressure in the interior space 1 is higher than in the pressure chamber 6, and closes the passage in the reverse situation. Thus, when the plunger 5 is moved to protrude further out of the cylinder 3, hydraulic fluid flows from the interior space 1 into the pressure chamber 6 via the check valve 7, and when the plunger 5 is urged into the cylinder 3, hydraulic fluid is pressurized, thereby increasing the pressure in the pressure chamber 6. The hydraulic fluid in the pressure chamber 6 thus gradually leaks through a leakage gap, thereby damping the movement or speed of the plunger 5. It will be understood that the particular operation of a tensioner is generally known by persons skilled in the art so that a detailed description thereof is omitted for the sake of simplicity.

Secured by a safety ring or circlip 8a to the plunger 5 is a spring plate 8 which forms a support surface for one end of a spring 9, for example, a helical compression spring. The other end of the spring 9 rests on the support member 9a. By means of the spring 9, the plunger 5 is urged in a direction that moves the plunger 5 out of the cylinder 3.

The open end of the housing 2 is closed by a cover 10 which has a central guide opening 11 for passage of the plunger 5. Arranged outside of the cover 10 is a seal 12 for sealing an annular opening bounded by the housing 2 and the plunger 5. The housing 2 includes a cylindrical receptacle 13 which forms a counterbore to define a radial shoulder or seat 14 for the cover 10 and the seal 12, whereby the cover 10 and the seal 12 bear with their outer peripheral surface upon the inside wall surface of the cylindrical receptacle 13.

Figure 2:
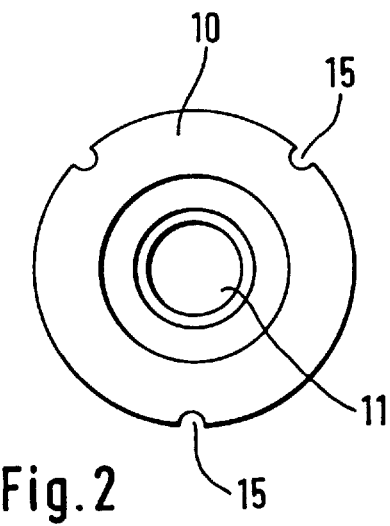
FIG. 2 is a detailed illustration of a cover for use in the tensioner of FIG. 1.
Figure 3:
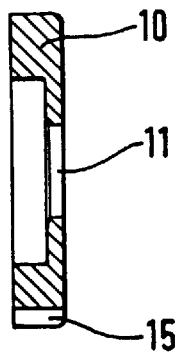
FIG. 3 is a sectional view of the cover of FIG. 2.

As shown in particular in conjunction with FIG. 2, the cover 10 is formed with a vent passageway in the form of three bores 15 which are spaced about the circumference of the cover 10 and, as shown in FIG. 3, extend along the entire width of the cover 10 in axial direction to establish a communication between the space between the seal 12 and the cover 10, on the one hand, and the interior space 1, on the other hand. It will be appreciated by persons skilled in the art that the arrangement of three bores 15 to form the vent passageway is done by way of example only, as the provision of more or less than three bores is certainly within the scope of the present invention. As best seen in FIG. 1, the bores 15 are so sized that their cross sectional area 16 projects radially inwards beyond the radial shoulder 14 formed by the counterbore 13. The dimension of the cross sectional area 16 of each bore 15 assures that, when the spring plate 8 impacts against the cover 10 during outward motion by the plunger 5, the vent passageway will not be blocked by the spring plate 8.

The cover 10 may be made of sintered material by a sintering process so that the bores 15 can be formed easily in a sintering mold.

The seal 12 is installed onto the plunger 5 and seated in the counterbore 13 after the cover 10 is put in place. As the seal 12 bears with its outer peripheral surface upon the inside wall surface of the counterbore 13, a gas cushion trapped between the cover 10 and the seal 12 is prevented to migrate past the seal 12 and into the atmospheric surroundings. The building overpressure of the trapped gas cushion can, however, escape via the bores 15 into the interior space 1. As a consequence of its large volume, the interior space 1 experiences only a slight pressure buildup by the ingress of gas, which pressure buildup is, therefore, only negligible In this situation, the pressure is balanced between the interior space 1 and the trapped gas cushion so that the seal 12 is not exposed to increased pressure that could cause an unseating or shift of the seal 12.

While the invention has been illustrated and described as embodied in a tensioner, it is not intended to be limited to the details shown since various modifications and structural changes may be made without departing in any way from the spirit of the present invention.

What is claimed as new and desired to be protected by Letters Patent is set forth in the appended claims:

1. A tensioner, comprising:

a housing defining an axis and having an interior space;

a cylinder received in the interior space of the housing;

a hydraulically dampened, spring-loaded plunger guided in the cylinder for displacement in an axial direction and tensioning of a traction member;

a cover closing the interior space of the housing and having a guide opening for passage of the plunger; and a seal mounted outside of the cover onto the plunger and destined to seal an annular opening bounded by the housing and the plunger, said cover being formed with a vent passageway in communication with the interior space for release of a gas cushion, forming between the seal and the cover, via the vent passageway into the interior space, wherein the housing is formed with a radial shoulder for support of the cover, said vent passageway of the cover being so sized as to overlie said radial shoulder and to project radially inwards beyond the radial shoulder.

2. The tensioner of claim 1 wherein the housing has a cylindrical receptacle so as to define a seat for the cover and for the seal, said cover and said seal each having an outer peripheral surface bearing upon an inside wall surface of the cylindrical receptacle.

3. The tensioner of claim 1 wherein the cover has an outer circumference, said vent passageway being formed by bores provided about the outer circumference of the cover.

4. The tensioner of claim 1 wherein the plunger is spring-loaded by a helical compression spring having one end resting on a housing bottom and another end bearing against a spring plate mounted on the plunger and impacting the cover at an impact zone when the plunger is moved out of the cylinder, with the vent passageway having an cross sectional area which is so positioned as to communicate with the interior space at least partially outside the impact zone.

* * * * *